3,265,724
HYDROXY NAPHTHYLMETHYL-AMINO BIS PROPIONITRILE AND BIS PROPIONIC ACID
Mitchell F. Zienty, Elkhart, Ind., assignor to Miles Laboratories, Inc., Elkhart, Ind., a corporation of Indiana
No Drawing. Filed Dec. 13, 1961, Ser. No. 159,151
5 Claims. (Cl. 260—465)

This invention relates to new compositions of matter and to a process for preparing the compositions. In particular, the invention concerns hydroxy naphthylmethylamino bis propionic acid derivatives as new compositions having utility as antioxidants in protecting edible fats and oils against oxidative deterioration.

It is well known that certain edible fats and oils, especially commercially prepared products, such as lard and corn oil, are deficient in natural antioxidants. Because of this deficiency such products are highly vulnerable to deterioration in the presence of oxygen or air and will become rancid during storage, as characterized by unpleasant odors and flavors and off-colors.

The present invention resides in the discovery that certain derivatives of hydroxy naphthylmethylamino bis propionic acids display exceptional antioxidative properties when incorporated into edible fats and fatty oils and products containing these compositions. Specifically, the novel inhibitors of this invention comprise 1-hydroxy-2-naphthylmethylamino-N-bis(propionitrile), 2-hydroxy-1-naphthylmethylamino-N-bis(propionitrile), and the corresponding acids derived therefrom: 1-hydroxy-2-naphthylmethylamino-N-bis(propionic acid) and 2-hydroxy-1-naphthylmethylamino-N-bis(propionic acid).

The novel compositions of this invention may be represented by the following general formulas—

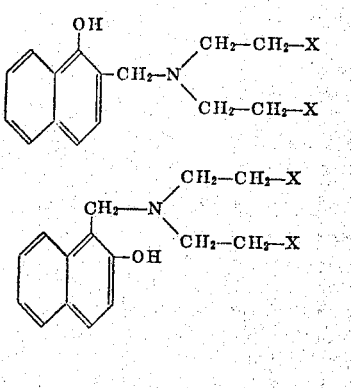

wherein X represents a functional group, such as —CN or —COOH.

The nitrile compositions are conveniently prepared as reaction products of β,β'-iminodipropionitrile, formaldehyde and α-naphthol or β-naphthol. The corresponding acid products are obtained by hydrolyzing the nitrile compounds with a hydroxide base, such as potassium hydroxide or sodium hydroxide.

The following equation, which illustrates the preparation of 1-hydroxy-2-naphthylmethylamino-N-bis(propionitrile) and the acid derivative thereof, is representative of the overall reaction:

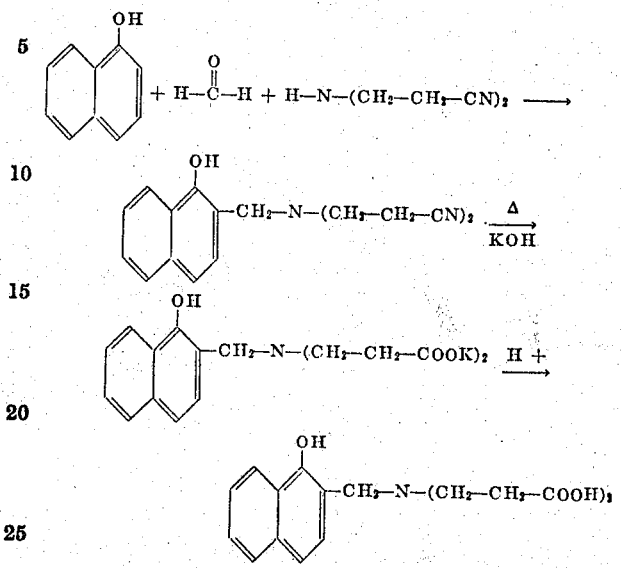

The 2-hydroxy-1-naphthylmethylamino-N-bis(propionitrile) compound of this invention, and the corresponding acid derivative, are obtained via the same procedure illustrated above, by using β-naphthol in place of α-naphthol.

Specific properties of the aforementioned compounds which make them particularly useful as antioxidants are non-toxicity, solubility in fats and oils and absence of undesirable odors, flavors and colors when incorporated into fatty substances to be protected.

In the practice of this invention the novel compounds are used to stabilize lard, castor oil and corn oil, but other materials which may likewise be protected include butter, beef tallow, linseed oil, rape seed oil, olive oil, palm oil, coconut oil, peanut oil, and the like.

To effectively inhibit oxidative deterioration in these materials the hydroxy naphthylmethylamino-N-bis propionic nitriles and acids of this invention are admixed therewith in small amounts, for example, from about 0.025% up to about 1.0% by weight, with the preferred concentration being about 0.025% to about 0.1% by weight.

When tested by means of the Swift Stability Test, commonly referred to as the Active Oxygen Method (AOM), subject antioxidants were found to retard rancidity in fats and oils for substantially longer periods of time than butylated hydroxy toluene, a well known lard antioxidant. The Swift Stability Test, which is described by A. F. King et al. in Oil and Soap Journal, vol. 10, pp. 105–109 (1933), consists in general of bubbling air through a sample of lard until rancidity develops, that is, until 20 milli-equivalents of hydrogen peroxide per kilogram of lard are produced.

Referring to the test data set out in the following table, the figures shown represent the time required (AOM time in hours) for rancidity to develop in lard, corn oil and castor oil when stabilized with the novel compositions of this invention, as compared to stabilization with butylated hydroxy toluene.

TABLE 1

| Inhibitor | AOM Time in Hours | | |
|---|---|---|---|
| | Lard | Castor Oil | Corn Oil |
| 1-hydroxy-2-naphthylmethylamino-N-bis (propionic acid) | 102 | 21 | 8 |
| 2-hydroxy-1-naphthylmethylamino-N-bis (propionic acid) | 72 | 30 | 16 |
| 1-hydroxy-2-naphthylmethylamino-N-bis (propionitrile) | 8 | 8 | 8 |
| 2-hydroxy-1-naphthylmethylamino-N-bis (propionitrile) | 8 | 8 | 8 |
| Butylated hydroxy toluene | 40 | 8 | 4 |

The following examples serve to illustrate, but not to limit, the procedures used in preparing the novel compositions of this invention:

*Example I.—Preparation of 1-hydroxy-2-naphthylmethylamino-N-bis(propionitrile)*

12.3 g. (0.1 mols) of $\beta,\beta'$-iminodipropionitrile were dissolved in 125 ml. of dioxane and 7.5 ml. of formalin were slowly added dropwise. The resulting mixture was stirred for 1 hour at room temperature. To this mixture were added 14.4 g. (0.1 mols) of α-naphthol all at once, and the reaction mixture was heated under reflux for 4 hours. The solvent, dioxane, was tripped off under reduced pressure, to give the crude nitrile product in the form of an oily residue, which was shown to possess antioxidant properties.

*Example II.—Preparation of 2-hydroxy-1-naphthylmethylamino-N-bis(propionitrile)*

12.3 g. (0.1 mols) of $\beta,\beta'$-iminodipropionitrile were dissolved in 125 ml. of dioxane and 7.5 ml. of formalin were slowly added dropwise. The resulting mixture was stirred for 1 hour at room temperature. To this mixture were added 14.4 g. (0.1 mols) of β-naphthol all at once, and the reaction mixture was heated under reflux for 3 hours. The solvent, dioxane, was stripped off under reduced pressure, leaving an oily residue. To induce crystallization the oily mixture was treated with ether. The crystalline product was collected by filtration, dissolved in hot ether and allowed to cool to room temperature. Upon cooling the individual crystals separated from the solution to give the final product as a white, amorphous powder. Yield 27 g. M.P. 100°–101° C.

*Analysis.*—Calc'd for $C_{17}H_{17}N_3O$: N, 15.05. Found: N, 14.84.

*Example III.—Preperation of 1-hydroxy-2-naphthylmethylamino-N-bis(propionic acid)*

61.5 g. (0.5 mols) of $\beta,\beta'$-iminodipropionitrile were dissolved, with stirring, in 500 ml. of dioxane. 37.5 ml. of formalin were slowly added dropwise and stirring was continued for 2 hours at room temperature. 72.08 g. (0.5 mols) of α-naphthol were then added all at once and the reaction mixture was heated under reflux for 6 hours. The solvent, dioxane, was stripped off under reduced pressure, leaving an oily residue, which was allowed to cool to room temperature. After cooling, 300 ml. of aqueous potassium hydroxide (65.0 g. potassium hydroxide in water) were added to the oily mixture and it was refluxed for 1 hour, during which time a considerable amount of ammonia gas evolved. This solution was cooled to room temperature, acidified with glacial acetic acid and the resulting crude acid which precipitated was collected by filtration. The solid precipitate was dissolved in methanol, heated to 60° C., treated with activated charcoal, precipitated with water, filtered and dried. The final product was a fine, white powder, which melted at 298°–300° C. Yield 27.0 g.

*Analysis.*—Calc'd for $C_{17}H_{19}NO_5$: N, 4.40. Found: N, 4.51.

*Example IV.—Preparation of 2-hydroxy-1-naphthylmethylamino-N-bis(propionic acid)*

31.7 g. (0.1 mols) of 2-hydroxy-1-naphthylmethylamino-N-bis(propionitrile) were placed in a 3-necked flask equipped with a stirrer and reflux condenser. To this compound were added 150 ml. of aqueous potassium hydroxide (37.5 g. potassium hydroxide in water) and the reaction mixture was heated under reflux for 3 hours. During the reflux period the potassium salt of the compound began to precipitate from solution. After reflux, the solution was cooled to room temperature, acidified with glacial acetic acid and the crude acid which precipitated was collected by filtration. The precipitate was dried, dissolved in hot benzene, treated with activated charcoal and filtered. The filtrate was treated with petroleum ether until the first permanent opalescence was observed and then cooled to room temperature to precipitate the final product as a colorless powder, melting at 197°–198.5° C. Yield 28.5 g.

*Analysis.*—Calc'd for $C_{17}H_{19}NO_5$: N, 4.40. Found: N, 4.56.

Following are examples illustrating utilization of the novel antioxidants of this invention in stabilizing various edible fats and oils against oxidative deterioration:

*Example V*

5 mg. of 1-hydroxy-2-naphthylmethylamno-N-bis(propionic acid) (0.025% by weight) were added to 20 g. of melted lard.

A commercially available rendered lard product was used, which had an uninhibited induction period of approximately 6 to 8 hours. As shown by the test data in Table 1, above, stabilization can be increased to approximately 102 hours using the inhibiting compound of this example.

*Example VI*

5 mg. of 2-hydroxy-1-naphthylmethylamino-N-bis(propionic acid) (0.025% by weight) were added to 20 g. of castor oil.

The castor oil used was a commercial product having an uninhibited induction period of approximately 20 hours. The data in Table 1, above, indicates that the inhibitor of this example stabilizes castor oil for approximately 30 hours.

*Example VII*

5 mg. of 2-hydroxy-1-naphthylmethylamino-N-bis(propionic acid) (0.025% by weight) were added to 20 g. of corn oil.

The corn oil of this example was a commercial product having an uninhibited induction period of approximately 3 hours. The test data of Table 1, above, clearly shows that stabilization of corn oil is increased to about 16 hours using the antioxidant composition of this example.

In summary, the present invention pertains to the preparation and application of novel naphthylmethylamino-N-bis propionic acid derivatives as highly useful oxidation inhibitors for edible fats and fatty oils. Subject compounds are admixed with edible fatty materials in small amounts, ranging from about 0.025% to about 1.0% by weight. The preferred antioxidant is 1-hydroxy-2-naphthylmethylamino-N-bis(propionic acid), comprising about 0.025% by weight of the fatty composition to be stabilized.

What is claimed is:

1. A compound selected from the group consisting of compounds of the formula—

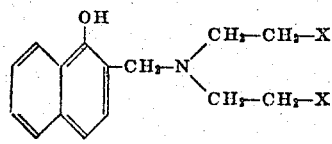

and compounds of the formula—

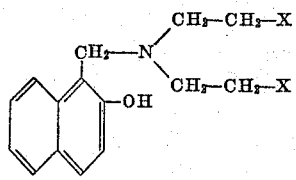

wherein X is a member of the group consisting of —CN and —COOH.

2. 1-hydroxy-2-naphthylmethylamino-N-bis (propionitrile).
3. 2-hydroxy-1-naphthylmethylamino-N-bis (propionitrile).
4. 1-hydroxy-2-naphthylmethylamino-N-bis (propionic acid).
5. 2-hydroxy-1-naphthylmethylamino-N-bis (propionic acid).

References Cited by the Examiner

UNITED STATES PATENTS

| | | | |
|---|---|---|---|
| 2,195,974 | 4/1940 | Reppe et al. | 260—518 X |
| 2,607,794 | 8/1952 | Chamberlin et al | 260—465 |
| 2,763,680 | 9/1956 | Sallmann | 260—465 X |
| 2,801,926 | 8/1957 | Thompson | 99—163 |
| 2,801,927 | 8/1957 | Thompson | 99—163 |
| 2,868,818 | 1/1959 | Pfister | 260—519 |
| 2,907,791 | 10/1959 | Schnitz et al. | 260—519 |

LORRAINE A. WEINBERGER, *Primary Examiner.*

ABRAHAM H. WINKELSTEIN, CHARLES B. PARKER, *Examiners.*

R. S. AULL, D. R. MAHANAND, L. A. THAXTON,
*Assistant Examiners.*